United States Patent
Wang et al.

(10) Patent No.: US 10,678,873 B2
(45) Date of Patent: Jun. 9, 2020

(54) METHOD AND SYSTEM FOR BLOG CONTENT SEARCH

(71) Applicant: TENCENT TECHNOLOGY (SHENZHEN) COMPANY LIMITED, Shenzhen, Guangdong (CN)

(72) Inventors: Jiaqiang Wang, Shenzhen Guangdong (CN); Jianguo He, Shenzhen Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 627 days.

(21) Appl. No.: 14/688,101

(22) Filed: Apr. 16, 2015

(65) Prior Publication Data

US 2015/0220650 A1    Aug. 6, 2015

Related U.S. Application Data

(63) Continuation of application No. PCT/CN2013/082893, filed on Sep. 4, 2013.

(30) Foreign Application Priority Data

Oct. 19, 2012    (CN) .......................... 2012 1 0401046

(51) Int. Cl.
*G06F 16/9535* (2019.01)
*G06F 16/31* (2019.01)
(Continued)

(52) U.S. Cl.
CPC ........ *G06F 16/9535* (2019.01); *G06F 16/319* (2019.01); *G06F 16/38* (2019.01); *G06F 16/2477* (2019.01)

(58) Field of Classification Search
None
See application file for complete search history.

(56) References Cited

U.S. PATENT DOCUMENTS 7,558,786 B2    7/2009  Robson et al.
8,762,326 B1 *  6/2014  Zhou ................. G06F 17/30864
                                                           707/609
(Continued)

FOREIGN PATENT DOCUMENTS

CN    102110160 A    6/2011
CN    102426610 A    4/2012
CN    102708187 A    10/2012

OTHER PUBLICATIONS

International Search Report, dated Dec. 19, 2013, pp. 1-5, issued in International Application No. PCT/CN2013/082893, State Intellectual Property Office of The P.R. China, Beijing, China.
(Continued)

*Primary Examiner* — Neveen Abel Jalil
*Assistant Examiner* — Katriel Y Chiu
(74) *Attorney, Agent, or Firm* — Sughrue Mion, PLLC

(57) ABSTRACT

A blog content search method and system are provided. The blog content search method may include receiving a search request. The search request may include a search term and a search time segment range. The method may include searching for an inverted data block of the search term from a database. Based on a timestamp skip list of the inverted data block and the search time segment range, the inverted data block may be skipped, and instead, another inverted data block may be identified that includes data that meets a condition of the search request. The identified inverted data block may be used for performing a merging. The search result may be obtained based on the result of the merging.

14 Claims, 3 Drawing Sheets

(51) Int. Cl.
G06F 16/38 (2019.01)
G06F 16/2458 (2019.01)

(56) References Cited

U.S. PATENT DOCUMENTS

| | | | |
|---|---|---|---|
| 2009/0144129 A1* | 6/2009 | Grouf | G06F 17/3005 705/14.42 |
| 2009/0319518 A1* | 12/2009 | Koudas | G06F 17/30696 |
| 2010/0325132 A1* | 12/2010 | Liu | G06F 17/30516 707/759 |
| 2011/0087707 A1* | 4/2011 | Abraham | G06F 17/30994 707/802 |
| 2011/0231416 A1* | 9/2011 | Goodchild Drake | G06F 17/30864 707/754 |
| 2012/0166180 A1* | 6/2012 | Au | G06F 17/27 704/9 |
| 2013/0041889 A1* | 2/2013 | Gotoh | H04L 67/02 707/722 |
| 2013/0046771 A1* | 2/2013 | Moitra | G06F 17/30705 707/749 |

OTHER PUBLICATIONS

Office Action dated May 2, 2017 for Chinese Application No. 201210401046.5, 12 pages.

Communication dated Dec. 29, 2017, from the State Intellectual Property Office of People's Republic of China in counterpart Application No. 201210401046.5.

* cited by examiner

METHOD AND SYSTEM FOR BLOG CONTENT SEARCH

The present application is a continuation of International Patent Application No. PCT/CN2013/082893, filed on Sep. 4, 2013, which claims the priority to Chinese Patent Application No. 201210401046.5, filed on Oct. 19, 2012, both of which are incorporated herein by reference in their entirety.

FIELD

The disclosure relates to the field of Internet technologies, and in particular, to a blog content search method and system.

BACKGROUND

A blog article or a microblog article published within a certain time segment may be searched in some situations. For example, a user may want to find and view an interesting quotation or article published at a certain time, and the user may search for the blog content within a specified time segment via a search time segment range in a blog search entry. For example, the blog content may be searched for content added on the previous day, within the last three days, or the like.

In an existing blog content search method, inverted data blocks are generated according to an reverse chronological sequence of articles based on their respective publication time. The inverted data blocks may include an inverted index data structure storing a mapping from the content, such as words to corresponding locations in a database file, or in a document, or a set of documents. The inverted data blocks may be used to perform a full text search to find particular words in the blog content. Upon receiving a search request including constituent search terms and a search time segment, the inverted data blocks of the constituent search terms are obtained and then merged. It is then determined whether the publication time of the content corresponding to the merged blocks is within the search time segment in the search request. The merged blocks are discarded if the publication time is not within the request time segment, else and the merged blocks are used as a qualified result if the corresponding publication time is within the requested time segment. When merging of the inverted data block of a search term is completed, merging continues to be performed on a next inverted data block of the search term, until merging of all inverted data blocks of the search term is completed or enough results are found.

In the existing blog content search method, merging and determining are performed on each inverted data block, which causes a long searching time, and a user needs to wait for a long time to obtain the search result. In addition, in the existing blog content search method, the result is returned, and the search is stopped, when certain amount of blog content is found. Therefore, the user may not find the expected result since not all results are returned.

SUMMARY

In one aspect of the present disclosure, a blog content search method is provided. the method may include receiving a search request, the search request including a search term and a search time segment range. The blog content search method also includes searching for a first inverted data block of the search term from a database. The blog content search method also include skipping, according to a timestamp skip list of the first inverted data block and the search time segment range, to a second inverted data block including data that meets a condition of the search request. The blog content search method may include performing merging on the second inverted data block. The blog content search method also includes providing a search result based on a search performed based on the result of the merging.

The blog content search method may further include generating inverted data blocks of a unit of content before receiving the search request, where the inverted data blocks of the unit of content are generated according to a blog content publication time. The blog content search method may also include adding a timestamp skip list indicating the blog content publication time to the inverted data blocks. The timestamp skip list may include a timestamp indicating last publication of each article of the inverted data block, and the timestamp skip list is added to a header of the inverted data block. Receiving the search request may include determining whether the search request contains the search time segment range. The merging may be performed on the second inverted data block of the search term including data that meets the condition if the search request contains the search time segment range. The merging may be performed on the first inverted data block which is searched for from the database if the search request does not carry the search time segment range. Skipping, according to the timestamp skip list of the first inverted data block and the search time segment range, to the second inverted data block including data that meets the condition includes: identifying that the second inverted data block includes data that meets the condition by using header information of the second inverted data block of the search term. The blog content search method may also include skipping to the second inverted data block including data that meets the condition. The performing merging on the second inverted data block including data that meets the condition may include performing time filtering on a merging result. The blog content search method may also include determining whether a predetermined number of filtering results have been found. The blog content search method may also include returning the filtering results as the search result if the predetermined number of filtering results have been found. The blog content search method may also include skipping, according to the timestamp skip list of the second inverted data block and the search time segment range, to another inverted data block including data that meets the condition if the number of filtering results that have been found is less than the predetermined number. The method may be applied to a conventional blog, a microblog, or a light blog.

In another aspect of the present disclosure, a blog content search system is further provided, including a processor and a non-transitory processor-readable medium having processor-executable instructions stored thereon, the processor-executable instructions including a plurality of modules. The modules may include a request receiving module configured to receive a search request, the search request including a search term and a search time segment range. The blog content search system also include a data skipping module configured to search for a first inverted data block of the search term from a database according to the search term in the search request, and skip searching the first inverted data block, according to a timestamp skip list of the first inverted data block and the search time segment range, to a second inverted data block including data that meets a condition of the search request. The blog content search system may also include a result returning module configured to perform merging on the second inverted data block including data that meets the condition and obtain a search result for the search request.

In still another aspect of the present disclosure, a computer program including program code is further provided. Execution of the program code may include receiving a search request, the search request including a search term and a search time segment range. The execution of the computer program also includes searching for inverted data blocks of the search term from a database. The execution of the computer program also includes identifying, according to a timestamp skip list of the respective inverted data blocks and the search time segment range, an inverted data block including data that meets the search request. The execution of the computer program also includes performing merging on the inverted data block including data that meets the search request and obtaining a search result.

According to the blog content search method and system of the present disclosure, a timestamp skip list indicating a blog content generation time is added to a header of the inverted data block. The inverted data block is directly skipped to an inverted data block from which a result may be obtained using the timestamp skip list based on a search time segment range input by a user. In this way, the search time is shortened and the search efficiency is improved. In addition, old data can be searched via the timestamp skip list, which ensures accuracy and completeness of the search result.

The foregoing description is only a summary of the technical solutions of the present disclosure. To understand and implement the technical solutions according to the disclosure and to make the foregoing and other aspects, features, and advantages of the present disclosure more understandable, embodiments of the present disclosure are described in detail below with reference to accompanying drawings.

BRIEF DESCRIPTION OF THE DRAWINGS

The example embodiments described throughout the present disclosure may be better understood with reference to the following drawings and description. The components in the drawings are not necessarily to scale. Moreover, in the drawings, like-referenced numerals designate corresponding parts throughout the different views.

DETAILED DESCRIPTION OF THE EMBODIMENTS

The foregoing and other technical content, features and effects of the present disclosure are clearly presented in the following description and accompanying drawings. The technical solutions and effects of the present disclosure can be understood through the detailed descriptions. The accompanying drawings and embodiments are merely provided for reference and description, and are not intended to limit the present disclosure.

Figure 1:
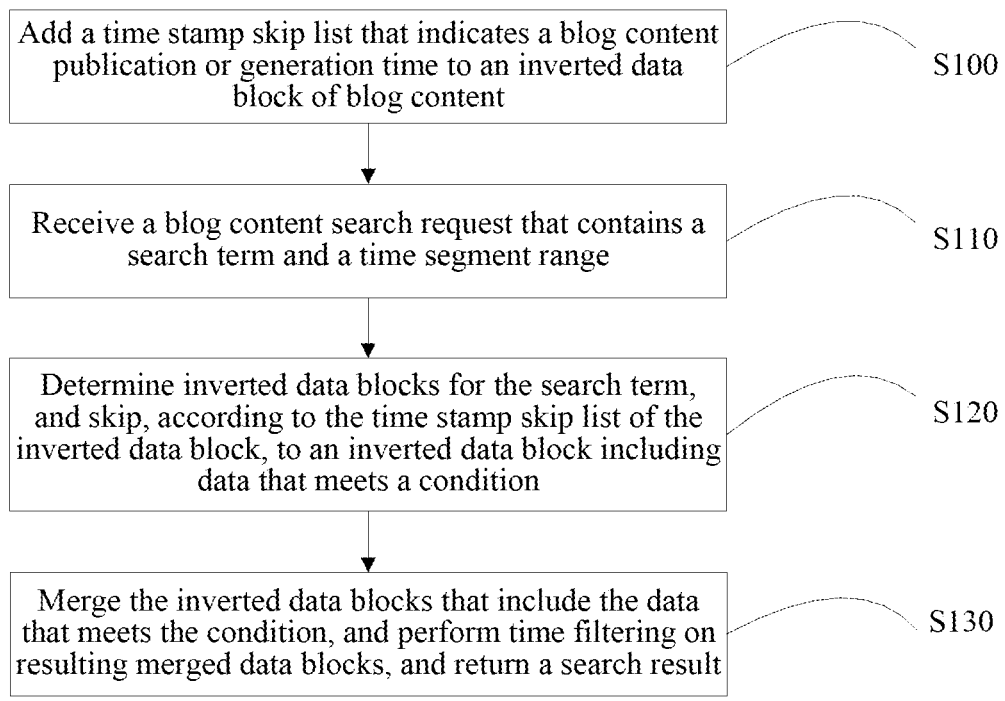
FIG. 1 is a flowchart of an example blog content search method.

FIG. 1 is a flowchart of an example blog content search method. As shown in FIG. 1, the blog content search method according to the embodiment may include at least steps S100 to S130.

In S100, a time stamp skip list indicating a blog content publication or generation time may be added to an inverted data block of the blog content.

The blog content may be published as, or may be part of one or more blog articles. A blog article may also be referred to as a blog post. The blog articles may be part of a single blog or multiple blogs. The blogs may be hosted by a blogging platform (such as WordPress), a microblog platform (such as Twitter), or a light blogging platform.

An inverted data block may be generated according to a reverse chronological sequence for a piece of blog data in blog content published within a predetermined period of time. The piece of blog data may be a unit of content, such as a word, a number, a phrase, or a sentence in the blog content. The inverted data block may include an inverted index data structure storing a mapping from the unit of content to corresponding location of the unit of content in a database file, or in a document, or a set of documents that contains the blog articles. The inverted data block may be used to perform a full text search to find occurrences of the unit of content in the blog content. In an example, the inverted data block may map the unit of content to chronological occurrence of the unit of content in the blog by using the predetermined period of time. The predetermined period of time may be one month, three months, or a time period set by a user or a system.

Alternatively, an inverted data blocks may be generated to map the unit of content to a sequential occurrence of the unit of content in the blog by using the a predetermined number of units of content. The mapping may be performed in reverse chronological order of publication. For example, the inverted data blocks may identify inverted index of the unit of content in a sequence of 5000 pieces of published blog data, or 10000 pieces of published blog data, or an arbitrary number of pieces of blog data set by the user or system.

For example, consider a blog that has been in publication for one year and that includes 50000 pieces of blog data. In an example, the blog may be indexed into four inverted data blocks in case the inverted data blocks are generated according to publication time of three months each. The inverted index of the unit of content in this case would map occurrence of the unit of information within the four possible blocks of three months each. In another example, the blog may be indexed into five inverted data blocks in case the inverted data blocks are generated according to an inverted sequence of publication time with 10000 pieces of blog data in each block. The inverted index of the unit of content in this case would map occurrence of the unit of information within the five possible blocks of 10000 units of content each. In addition, the blog content may be ranked according to the blog data generation time, which may be the time at which the blog data is published or posted.

In an example, the inverted data block may have a corresponding header. A timestamp skip list may be added to the header of the inverted data block. The timestamp skip list may be used to identify the inverted data block of the blog from which a search result may be obtained based on a search term and a search time segment range of a search query. The timestamp skip list may facilitate skipping one or more inverted data blocks of the search term during the search, thus facilitating a more efficient and consequently a quicker search. An example structure of the header of the inverted data block is as follows:

| some information about the inverted header | total number of data blocks (BlockNum) | time stamp skip list (TimeStamp SkipList) | other information about the inverted header |
| --- | --- | --- | --- |

The timestamp skip list (TimeStampSkipList) may include a timestamp that indicates a time at which the latest (in time) post, or article of each inverted data block was published or generated. In an example, the timestamp skip list may be stored as an array with a total of 4*BlockNum bytes, where BlockNum is the total number data blocks that are indexed by the inverted data block. For example, if the inverted data block maps occurrence of the unit of information across fifty (50) articles, the BlockNum is 50. It may be understood that the header structure of the inverted data block is not limited to the foregoing specific structure.

In S110, a blog content search request may be received. The search request may include a search term and a search time segment range.

In S110, the search time segment range may be set arbitrarily by a user.

In S120, an inverted data block corresponding to the search term may be searched for and obtained from a database. The identified inverted data block may be skipped, according to a time stamp skip list in the header of the identified inverted data block, to another inverted data block including data that meets a predetermined condition.

Thus, in step S120, a set of inverted data blocks corresponding to the search term may be identified. Further, from the identified set of inverted data blocks, a subset of inverted data blocks including data that meets the predetermined condition are determined by using header information of the inverted data blocks in that set. Further yet, from the subset of inverted data blocks, the inverted data block that includes data that meets the predetermined condition is obtained to perform a subsequent search operation.

In an example where the search term contains more than one constituent terms, another inverted data block of the search term may be obtained for each constituent term. Thus, Step S120 may provide one or more inverted data blocks that include data that meets the predetermined condition and that may be used for the subsequent search operation.

The inverted data block including data that meets the condition may refer to that the inverted data block possibly including data that meets the search time segment range in the search request.

In S130, merging may be performed on the inverted data block that include data that meets the condition. Further, time filtering may be performed on the results of the merging, and a search result from the time filtered inverted data block may be returned. For example, the inverted data blocks identified for each separate constituent terms of the search term may be merged by S130.

The time filtering may include filtering the results of the merging operation according to the search time segment range input by the user. If enough results are obtained after the time filtering is performed on the results of the merging, the search may end; or otherwise, the step S120 may be performed to search for a next inverted data block including data that meets the condition.

The following is a specific application of an example blog data search method described throughout the present disclosure. It will be understood that embodiments of the present disclosure are not limited to the specific application. For example, a user may search blog content with a combination of a keyword A and a keyword B, and with a search time segment range from 2011-4-1 to 2011-4-10. The keyword A and the keyword B may be combined in any form, for example, the keyword A and the keyword B may be combined to form a character string "AB"; or the keyword A and the keyword B may be separated by using a symbol such as a space.

The inverted data blocks of the blog may include time information. The time information may be added by an indexing module of a system that searches the blog. In an example, the time information may be in a format of an array composed of a timestamp indicating time of generation of the last article of each inverted data block. For example, timestamp skip list information of the keyword A for a corresponding inverted data block is {2012-4-01 0:0:0, 2012-1-01 0:0:0, 2011-8-01 0:0:0, 2011-6-01 0:0:0, 2011-1-01 0:0:0, 2010-10-01 0:0:0, . . . }, and timestamp skip list information of the keyword B for a corresponding inverted data block is {2012-3-01 0:0:0, 2011-12-01 0:0:0, 2011-7-01 0:0:0, 2011-3-01 0:0:0, 2011-2-01 0:0:0, 2010-11-01 0:0:0, . . . }. In an example, keywords A and B may each have multiple timestamp skip list. Each timestamp skip list may correspond to respective inverted data block. In another example, each keyword may have a single timestamp skip list that is added to headers of each inverted data block of the keyword.

A search module performs the following steps (1) to (4) according to a data index provided by the indexing module.

(1) The first inverted data blocks of the keywords A and the keyword B and their relevant information are obtained separately. Each keyword may have a corresponding first inverted data block.

(2) It is determined, according to the timestamp skip list in the first inverted data block, whether a result that meets a condition may be obtained from the first inverted data block; and if not, the first inverted data block is skipped and the second inverted data block is obtained, and so on.

It may be determined, according to the timestamp skip list, that timestamp information of the first to fourth inverted data blocks of the keyword A is respectively 2012-4-01 0:0:0, 2012-1-01 0:0:0, 2011-8-01 0:0:0, and 2011-6-01 0:0:0, which are all later than the search time segment range from 2011-4-1 to 2011-4-10. Therefore, the result that meets the condition cannot be obtained from the first to fourth inverted data blocks. Time stamp information of the fifth inverted data block 2011-1-01 0:0:0 is earlier than the search time segment range from 2011-4-1 to 2011-4-10. Hence, a result that meets the condition may be obtained from the fifth inverted data block for the keyword A. Similarly, a result that meets the condition may be obtained from the fourth inverted data block for the keyword B.

(3) The two inverted data blocks of the two keywords A and B that meet the condition may be selected, in the above example, the fifth inverted data block of the keyword A and the fourth inverted data block of the keyword B, are selected. Merging may be performed on the two inverted data blocks. Blog articles that include the combination of the two keywords A and B are found from the merged blocks. In addition, time filtering may be performed on the merged blocks to find a blog article that includes the combination of the two keywords A and B and is within the search time segment range from 2011-4-1 to 2011-4-10.

(4) If at least a predetermined number of results that are obtained from the merged blocks corresponding to the condition using a combination of the two keywords A and B, the search may end; or otherwise, step (2) may be performed again to search for a next inverted data block from which a result that meets the condition may be obtained.

Figure 2:
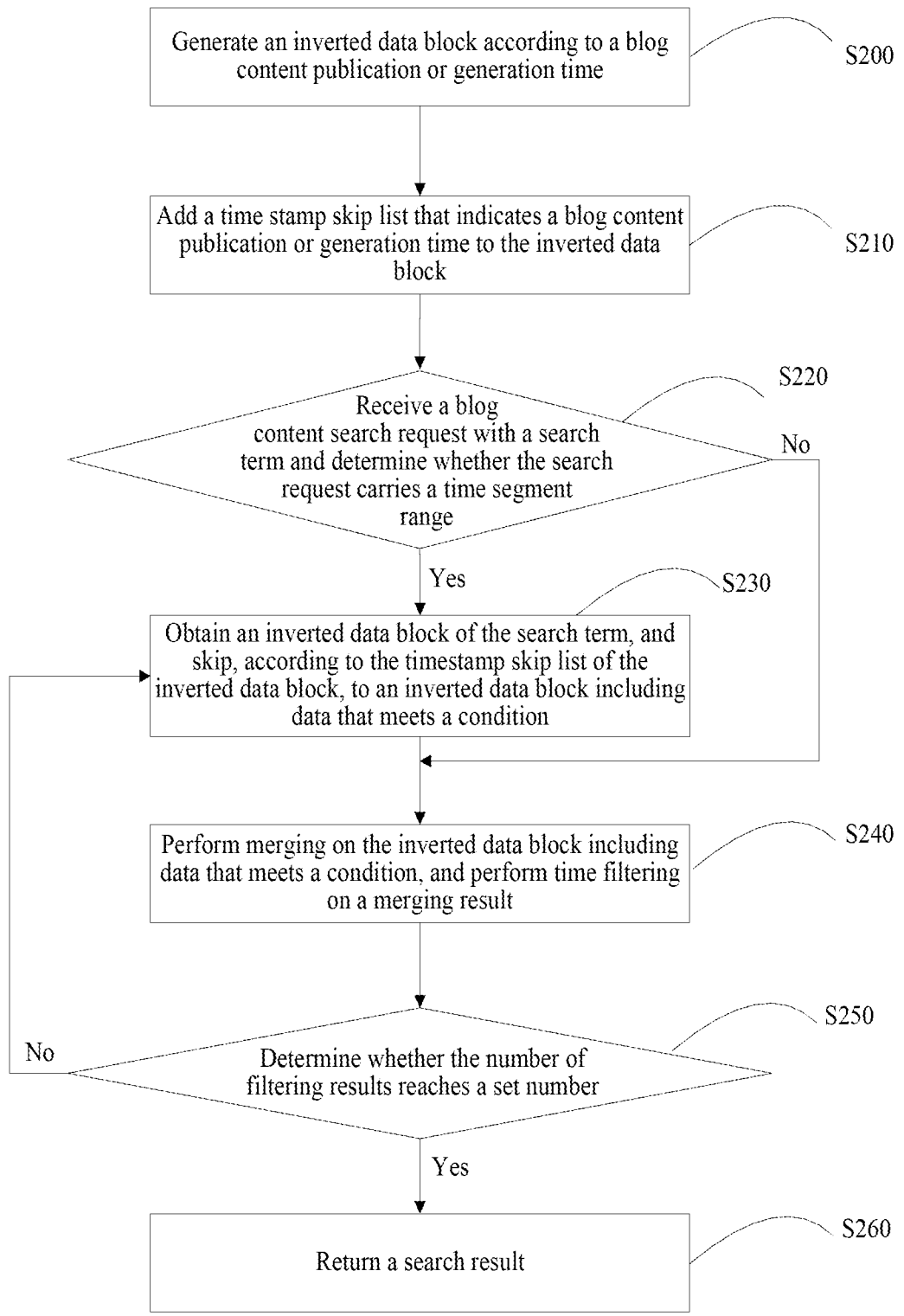
FIG. 2 is a flowchart of an example blog content search method.

FIG. 2 is a flowchart of another blog content search method. As shown in FIG. 2, the blog content search method according to the embodiment may include at least steps S200 to S260.

In S200, an inverted data block may be generated according to a blog content publication or generation time.

In an example, the inverted data block is generated according to a chronologically reverse sequence of blog content published for a certain period of time. The predetermined time period may be one month, three months, or any other time period. The time period may be setup by a user or a system. Alternatively, the inverted data block may be generated according to a reverse chronological sequence of published blog content for certain pieces of blog data. For example, the inverted data block may be for a certain number of pieces of blog data such as 5000 blog posts, or 10000 blog posts, or any other number of blog posts. The user or system may set the number of blog posts included in the inverted data block. For example, an entire blog is with a publication time of one year and blog data of 50000 pieces, then there are totally four inverted data blocks in a case that the inverted data blocks are generated according to an inverted sequence of publication time for three months, and there are totally five inverted data blocks in a case that the inverted data blocks are generated according to an inverted sequence of publication time for 10000 pieces of blog data.

In S210, a timestamp skip list indicating a blog content publication or generation time may be added to the inverted data block.

The timestamp skip list may be added to a header of each inverted data block. The timestamp skip list may be used to directly skip to an inverted data block from which a result may be obtained, instead of searching through all inverted data blocks of the blog being searched. For example, the timestamp skip list may facilitate the skipping based on the search time segment range in the search request. In an example, a header structure of the inverted data block is as follows:

| some information about the inverted header | total number of data blocks (BlockNum) | time stamp skip list (TimeStamp SkipList) | other information about the inverted header |
| --- | --- | --- | --- |

The timestamp skip list (TimeStampSkipList) may include a time stamp indicating generation of the last article of each inverted data block, which forms an array and has a total of 4*BlockNum bytes. It may be understood that the header structure of the inverted data block is not limited to the foregoing specific structure.

In S220, a blog content search request may be received, and it may be determined whether the search request includes a time segment range. S230 may be performed if the search request includes a time segment range, else S240 may be performed if the search request does not include a time segment range. The search request may include a search term. The search term may include a combination of one or more keywords. For example, the combination may be a Boolean expression of the one or more keywords.

The time segment range in the received search request may be set by a user. The time segment range may indicate that only the blog posts published during that time segment range are to be searched for the search term included in the search request.

In S230, a first inverted data block of a search term in the search request is obtained. The first inverted data block may be skipped, that is a search within the first inverted data block may not be performed, in response to the timestamp skip list in the header of the first inverted data block failing to meet the time segment range of the search request. For example, the timestamp skip list in the header of the first inverted data block may be outside the time segment range. Further, a second inverted data block of the search term that meets the condition may be identified using the timestamp skip list. The second inverted data block may be searched for the search term of the search request to obtain search results.

In S230, a first inverted data block of the search term may be selected. Whether the first inverted data block includes data that meets the condition may be determined by first examining the header information of the first inverted data block. A subsequent search operation may be performed within the first inverted data block, if examining the timestamp skip list in the header information indicates that the first inverted data block contains content published in the search time segment range of the search request. In addition or alternatively, a second inverted data block of the search term may also be selected.

In S240, merging may be performed on the first inverted data block that includes data that meets the condition. For example, the first inverted data block may be merged with the second inverted data block. In an example, the first inverted data block and the second inverted data block may each correspond to separate constituent terms within the search term. Time filtering may be performed on a merging result.

The time filtering refers to filtering the merging result according to the search time segment range of the search request.

In S250, it may be determined whether the number of filtering results meets a predetermined threshold number. In case the predetermined threshold number is reached, S260 may be performed; otherwise, S230 may be performed.

In S260, a search result may be returned and presented in response to the search request. For example, the result may be displayed on a display device. Alternatively or in addition, the result may be transmitted to a device for presentation.

Figure 3:
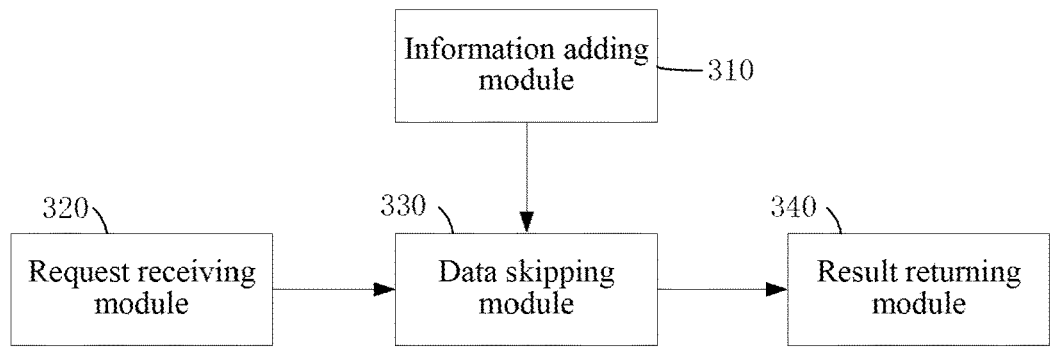
FIG. 3 is a schematic structural diagram of an example blog content search system.

FIG. 3 is a schematic structural diagram of an example blog content search system. The blog content search system may include an information adding module 310, a request receiving module 320, a data skipping module 330, and a result returning module 340.

The information adding module 310 may add a timestamp skip list indicating a blog content publication or generation time to an inverted data block of blog content.

The timestamp skip list may be added to a header of each inverted data block. The timestamp skip list may be used to directly skip to an inverted data block from which a result may be obtained based on the search time segment range of a search request. For example, the information adding module 310 may add a header to each inverted data block, with the header having a following structure. In other examples, the information adding module 310 may add headers with different structures.

| some information about the inverted header | total number of data blocks (BlockNum) | time stamp skip list (TimeStamp SkipList) | other information about the inverted header |
| --- | --- | --- | --- |

The timestamp skip list (TimeStampSkipList) in a header of the inverted data block may include a timestamp that represents time of generation of the last article of the data block indexed by the inverted data block. In an example, the timestamp skip list may be recorded as an array that has a total of 4*BlockNum bytes, where the BlockNum is the number of data blocks that are indexed by the inverted data block. It will be understood that the header structure of the inverted data block is not limited to the foregoing specific structure.

The request receiving module 320 may receive a blog content search request. The search request may include a search term and a time segment range. The search term may include one or more keywords. The search term may be a combination, such as a Boolean expression, of the keywords. The time segment range may limit the blog posts that are to be searched for the search term. The time segment range may be set according to requirement of a user initiating the search request.

The request receiving module 320 may separate the search term into its constituent keywords. The system may search for inverted data blocks for the separate keywords and the results may then be merged as described throughout the present disclosure.

The data skipping module 330 may search for and identify one or more inverted data blocks corresponding to the search term in the search request. For example, the data skipping module 330 may identify the inverted data blocks from a database according to the search term in the search request.

The data skipping module 330 may examine the timestamp skip list in the respective headers of the one or more identified inverted data blocks. The data skipping module 330, based on the examination, may determine to skip performing a subsequent search based on an inverted data block. The data skipping module 330 may, instead, identify a second inverted data block that corresponds to the search term, and meets a condition to perform a subsequent search operation based on the timestamp skip list of the second inverted data block. In addition, the data skipping module 330 may identify more inverted data blocks corresponding to the search term to perform further search operation on.

The result returning module 340 may perform merging and filtering on the inverted data blocks identified by the data skipping module 330. The result returning module 340 may also return a search result.

Figure 4:
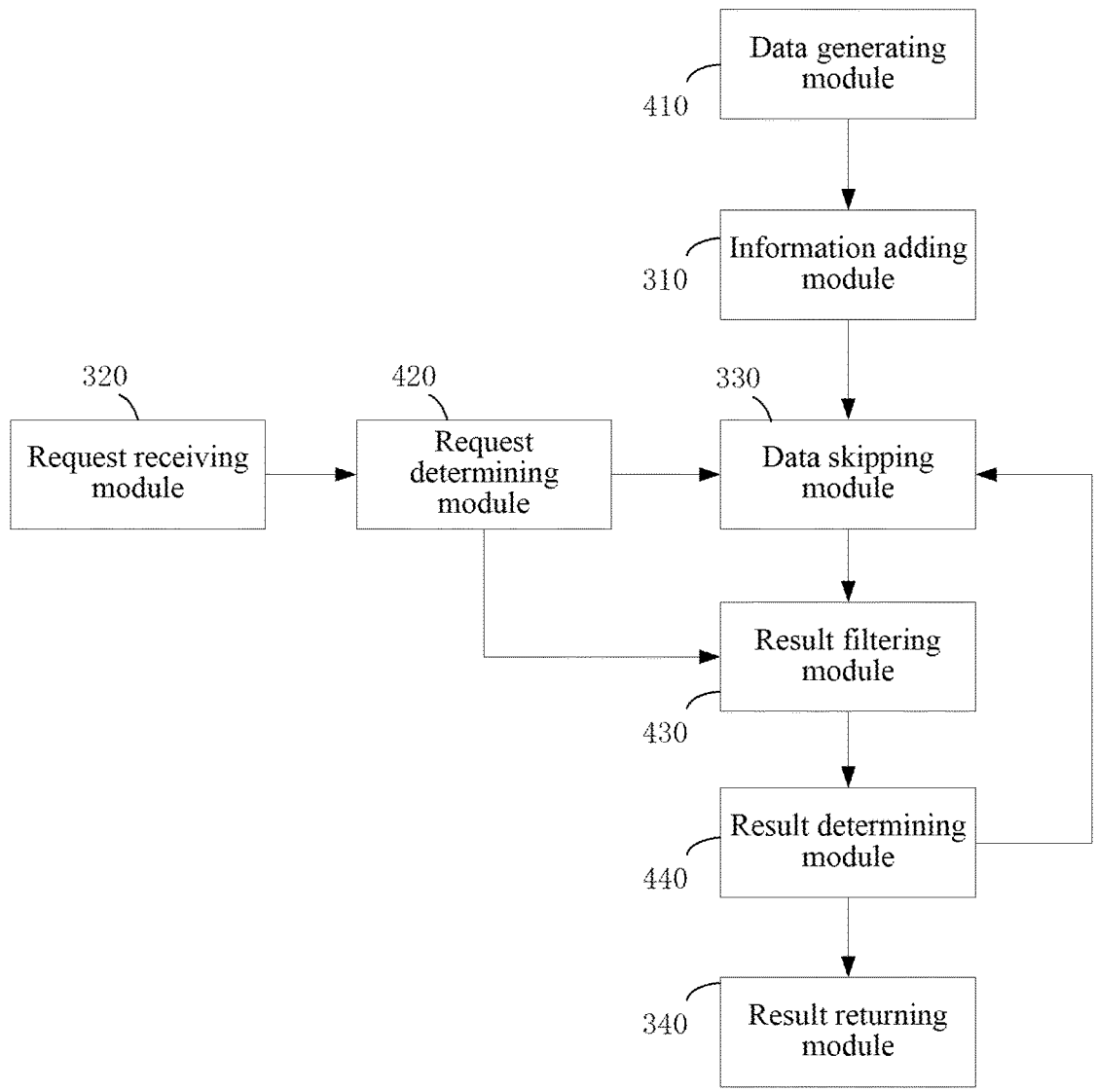
FIG. 4 is a schematic structural diagram of an example blog content search system.

FIG. 4 is a schematic structural diagram of an example blog content search system. The blog content search system may include a data generating module 410, the information adding module 310, the request receiving module 320, a request determining module 420, the data skipping module 330, a result filtering module 430, a result determining module 440, and the result returning module 340.

The data generating module 410 may generate an inverted data block according to a blog content based on publication or generation time of blog content. The data generating module 410 may generate the inverted data block according to a reverse chronological sequence of the publication time of the blog content. In addition, the data generation module 410 may rank the blog content according to the publication time of the blog content.

The information adding module 310 may add the timestamp skip list that indicates the blog content publication or generation time to the header of the inverted data block of blog content.

A timestamp skip list may be added to a header of the inverted data block. The inverted data block may be directly skipped to another inverted data block from which a result may be obtained via the timestamp skip list based on the search time segment range input by a user. For example, a header structure of the inverted data block is as follows:

| some information about the inverted header | total number of data blocks (BlockNum) | time stamp skip list (TimeStamp SkipList) | other information about the inverted header |
| --- | --- | --- | --- |

The timestamp skip list (TimeStampSkipList) may include a time stamp indicating generation of the last article of each data block indexed by the inverted data block. The timestamp skip list may form an array that has a total of 4*BlockNum bytes, BlockNum being the number of the data blocks indexed. It may be understood that the header structure of the inverted data block is not limited to the foregoing specific structure.

The request receiving module 320 may receive a blog content search request. The search request may contain a search term and a search time segment range. The search request may initiate a search for posts that are related to the search term and have been posted within the search time segment range using the blog search system and/or methods described throughout the present disclosure.

The request determining module 420 may determine whether the search request contains the time segment range. If the search request contains the time segment range, the data skipping module 330 may identify an inverted data block corresponding to the search term. Otherwise, if the search request does not carry a time segment range, the result filtering module 430 may perform a merging operation on the inverted data block that include data that meets a condition of the search term alone.

The data skipping module 330 may search for and obtain an inverted data block of the search term from a database. The data skipping module 330 may examine the timestamp skip list of the inverted data block based on the search time segment range. Based on the examination, the data skipping module 330 may skip to another inverted data block including data for the search term. The data skipping module 330 may obtain the inverted data blocks of the search term, determine a first inverted data block including data that meets the time range condition by using the header information of the first inverted data block, and then obtain the data block indexed by the inverted data block that on which to perform a subsequent search operation. In addition, the data skipping module may also obtain another inverted data block for the search term, for example for a separate constituent within the search term.

The result filtering module 430 may perform merging on the inverted data blocks that data that meets the condition of the search query. The result filtering module 430 may perform time filtering on the resulting merged inverted data blocks, and return a filtering result.

The result determining module 440 may determine whether the number of filtering results reaches a set number; and if the number of filtering results reaches the set number, the result returning module returns the search result; or otherwise, the data skipping module obtains another inverted data block of the search term.

The result returning module 340 may return the search result.

According to an embodiment of the present disclosure, the blog content search method shown in FIG. 1 may be performed by the modules in the blog content search system shown in FIG. 3 or FIG. 4. For example, S100 shown in FIG. 1 may be performed by the information adding module 310 shown in FIG. 3 or FIG. 4. S110 shown in FIG. 1 may be performed by the request receiving module 320 shown in FIG. 3 or FIG. 4. S120 shown in FIG. 1 may be performed by the data skipping module 330 shown in FIG. 3 or FIG. 4. S130 shown in FIG. 1 may be performed by the result returning module 340 shown in FIG. 3 or FIG. 4.

According to another embodiment of the present disclosure, the blog content search method shown in FIG. 2 may be performed by the modules in the blog content search system shown in FIG. 4. For example, S200 shown in FIG. 2 may be performed by the data generating module 410 shown in FIG. 4. S210 shown in FIG. 2 may be performed by the information adding module 310 shown in FIG. 4. S220 shown in FIG. 2 may be performed by a combination of the request receiving module 320 and the request determining module 420 shown in FIG. 4. S230 shown in FIG. 2 may be performed by the data skipping module 330 shown in FIG. 4. S240 shown in FIG. 2 may be performed by the result filtering module 430 shown in FIG. 4. S250 shown in FIG. 2 may be performed by the result determining module 440 shown in FIG. 4. S260 shown in FIG. 2 may be performed by the result returning module 340 shown in FIG. 4.

According to another embodiment of the present disclosure, some or all of the modules in the blog content search system shown in FIG. 3 or FIG. 4 may be combined into one or several other modules, or one module (some modules) may be divided into multiple smaller modules functionally, such modifications can achieve the same operations and do not affect technical effects of the embodiments of the present disclosure.

According to another embodiment of the present disclosure, the blog content search system shown in FIG. 3 or FIG. 4 may be constructed and the blog content search method according to embodiments of the present disclosure may be implemented by running a computer program (including program code) that can perform the blog content search method shown in FIG. 1 or FIG. 2 on a general computing device such as a computer that includes processing components and storage components such as a central processing unit (CPU), a random access memory (RAM) and a read-only memory (ROM). The computer program may be recorded on, for example, a computer readable recording medium, loaded onto the foregoing computing device by using the computer readable recording medium, and run on the foregoing computing device.

According to the blog content search method and system in the embodiments of the present disclosure, a timestamp skip list indicating a blog content generation time is added to a header of the inverted data block, and it is directly skipped to an inverted data block from which a result may be obtained via the timestamp skip list based on a search time segment range input by a user. In this way, the search time is shortened and the search efficiency is improved. In addition, old data can be searched via the timestamp skip list, which ensures accuracy and completeness of the search result.

For example, a blog may contain multiple articles. Each article may contain text and/or numbers. Each article may be associated with a respective timestamp at which the article was published. The blog may be indexed to obtain inverted data blocks, or inverted indices of the articles. For example, an inverted index may be obtained for each text symbol that may be found in the articles. The inverted index for a symbol, for example, may indicate all the articles in which that symbol is used.

The inverted indices are used in response to a search query that may be received to search for a search term. The search term may include one or more keywords. Using the inverted indices for a first keyword, a set of articles that contain the first keyword may be identified. Similarly, sets of articles that contain the other keywords of the search term may be identified using the inverted indices of the respective keywords. The identified sets may be merged, by taking an intersection of the sets, to identify the articles that contain all the keywords in the search term.

The described examples of method and system for blog search improve a conventional search technique by generating inverted indexes in an innovative manner. For example, the inverted indexes are generated in reverse chronological order of the articles in the blog and further, separate inverted indexes may be generated for predetermined blocks of the articles. For example, the articles may be divided based on a publication time. For example, the articles of the blog may be categorized into groups of articles published within three month periods. Separate inverted indexes may be generated for each group. Alternatively, the articles may be grouped based on a number of articles, such as each group contains 5000 articles. Inverted indexes may be generated for each such group.

A further improvement proposed in the present disclosure is to add, in a header of each inverted index, a timestamp skip list. The timestamp skip list may identify the last publication time of an article that is indexed in the inverted index. Such a modified inverted index strategy, as described throughout the above examples, facilitates efficient search. Particularly, higher efficiency may be observed if the search request contains a search term and a search time range that indicates searching only those articles that have been published within the specified time range. In such a case, the timestamp skip list may facilitate skipping the inverted index that may not provide a result for the search result. Thus, only those inverted indexes that identify articles that were published within the specified time range are merged using this strategy. Accordingly, a detailed search is performed on lesser number of articles thus leading to quicker search results.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A blog content search method comprising:

receiving, by a processor in communication with a memory storing program instructions, a search request, the search request comprising a search term comprising a first keyword, a second keyword and a search time segment range;

obtaining, by the processor, from a database, a first inverted data block comprising first data that meets a condition for the first keyword, and a second inverted data block comprising second data that meets the condition for the second keyword, wherein the memory stores the database storing a plurality of inverted data blocks, the first inverted data block comprises a first time stamp skip list comprising a first timestamp indicating a first time at which a first latest article of the first inverted data block is generated, and the second inverted data block comprises a second time stamp skip list comprising a second timestamp indicating a second time at which a second latest article of the second inverted data block is generated;

determining, by the processor, whether the first time at which the first latest article of the obtained first inverted data block is generated is later than the search time segment range;

determining, by the processor, whether the second time at which the second latest article of the second inverted data block is generated is later than the search time segment range;

in response to the first time at which the first latest article of the first inverted data block is generated being determined to be later than the search time segment range, skipping, by the processor, the first inverted data block;

in response to the second time at which the second latest article of the second inverted data block is generated being determined to be later than the search time segment range, skipping, by the processor, the second inverted data block;

in response to the first time at which the first latest article of the first inverted data block is generated being determined to be earlier than the search time segment range, and the second time at which the second latest article of the second inverted data block is generated being determined to be earlier than the search time segment range, merging, by the processor, the first inverted data block and the second inverted data block;

performing, by the processor, time filtering the first inverted data block and the second inverted data block that are merged, to find one or more articles comprising the first keyword and the second keyword and being generated within the search time segment range;

determining, by the processor, whether a number of the found one or more articles reaches a set number;

in response to the number of the one or more articles being determined to reach the set number, returning, by the processor, the one or more articles as a search result; and in response to the number of the one or more articles being determined to not reach the set number, obtaining, by the processor, from the database, a third inverted data block comprising third data that meets the condition for the search term.

2. The blog content search method according to claim 1, further comprising:

generating the plurality of inverted data blocks, based on a blog content publication or generation time; and adding a plurality of time stamp skip list indicating the blog content publication or generation time respectively to the plurality of inverted data blocks, before the receiving the search request.

3. The blog content search method according to claim 2, wherein the plurality of time stamp skip lists are respectively added to headers of the plurality of inverted data blocks.

4. The blog content search method according to claim 1, wherein each of the first inverted data block, the second inverted data block and the third inverted data block is obtained using header information of a respective one of the first inverted data block, the second inverted data block and the third inverted data block.

5. The blog content search method according to claim 1, wherein the method is applied to any one or any combination of a conventional blog, a microblog and light blogging.

6. A blog content search system comprising:

at least one memory configured to store computer program code; and at least one processor configured to access the at least one memory and operate according to the computer program code, the computer program code comprising:

requesting receiving code configured to cause the at least one processor to receive a search request, the search request comprising a search term comprising a first keyword, a second keyword and a search time segment range;

data skipping code configured to cause the at least one processor to:

obtain, from a database, a first inverted data block comprising first data that meets a condition for the first keyword, and a second inverted data block comprising second data that meets the condition for the second keyword, wherein the at least one memory stores the database storing a plurality of inverted data blocks, the first inverted data block comprises a first time stamp skip list comprising a first timestamp indicating a first time at which a first latest article of the first inverted data block is generated, and the second inverted data block comprises a second time stamp skip list comprising a second timestamp indicating a second time at which a second latest article of the second inverted data block is generated;

determine whether the first time at which the first latest article of the obtained first inverted data block is generated is later than the search time segment range;

determine whether the second time at which the second latest article of the second inverted data block is generated is later than the search time segment range;

in response to the first time at which the first latest article of the first inverted data block is generated being determined to be later than the search time segment range, skip the first inverted data block; and in response to the second time at which the second latest article of the second inverted data block is generated being determined to be later than the search time segment range, skip the second inverted data block;

result returning code configured to cause the at least one processor to, in response to the first time at which the first latest article of the first inverted data block is generated being determined to be earlier than the search time segment range, and the second time at which the second latest article of the second inverted data block is generated being determined to be earlier than the search time segment range, merge the first inverted data block and the second inverted data block;

result filtering code configured to cause the at least one processor to perform time filtering on the first inverted data block and the second inverted data block that are merged, to find one or more articles comprising the first keyword and the second keyword and being generated within the search time segment range; and result determining code configured to cause the at least one processor to:
  determine whether a number of the found one or more articles reaches a set number, and
  in response to the number of the one or more articles being determined to reach the set number, return the one or more articles as a search result; and
wherein the data skipping code is further configured to cause the at least one processor to, in response to the number of the one or more articles being determined to not reach the set number, obtain, from the database, a third inverted data block comprising third data that meets the condition for the search term.

7. The blog content search system according to claim 6, further comprising:
  data generating code configured to cause the at least one processor to generate the plurality of inverted data blocks, based on a blog content publication or generation time; and
  information adding code configured to cause the at least one processor to add a plurality of time stamp skip lists indicating the blog content publication or generation time respectively to the plurality of inverted data blocks, before the search request is received.

8. The blog content search system according to claim 7, wherein the plurality of time stamp skip lists are respectively added to headers of the plurality of inverted data blocks.

9. The blog content search system according to claim 6, wherein each of the first inverted data block, the second inverted data block and the third inverted data block is obtained using header information of a respective one of the first inverted data block, the second inverted data block and the third inverted data block.

10. The blog content search system according to claim 6, wherein the system is applied to any one or any combination of a conventional blog, a microblog and light blogging.

11. A non-transitory computer-readable storage medium storing instructions that cause at least one processor to:
  receive a search request, the search request comprising a search term comprising a first keyword, a second keyword and a search time segment range;
  obtain, from a database, a first inverted data block comprising first data that meets a condition for the first keyword, and a second inverted data block comprising second data that meets the condition for the second keyword, wherein a memory stores the database storing a plurality of inverted data blocks, the first inverted data block comprises a first time stamp skip list comprising a first timestamp indicating a first time at which a first latest article of the first inverted data block is generated, and the second inverted data block comprises a second time stamp skip list comprising a second timestamp indicating a second time at which a second latest article of the second inverted data block is generated;
  determine whether the first time at which the first latest article of the obtained first inverted data block is generated is later than the search time segment range;
  determine whether the second time at which the second latest article of the second inverted data block is generated is later than the search time segment range;
  in response to the first time at which the first latest article of the first inverted data block is generated being determined to be later than the search time segment range, skip the first inverted data block;
  in response to the second time at which the second latest article of the second inverted data block is generated being determined to be later than the search time segment range, skip the second inverted data block;
  in response to the first time at which the first latest article of the first inverted data block is generated being determined to be earlier than the search time segment range, and the second time at which the second latest article of the second inverted data block is generated being determined to be earlier than the search time segment range, merge the first inverted data block and the second inverted data block;
  perform time filtering on the first inverted data block and the second inverted data block that are merged, to find one or more articles comprising the first keyword and the second keyword and being generated within the search time segment range;
  determine whether a number of the found one or more articles reaches a set number;
  in response to the number of the one or more articles being determined to reach the set number, return the one or more articles as a search result; and
  in response to the number of the one or more articles being determined to not reach the set number, obtain, from the database, a third inverted data block comprising third data that meets the condition for the search term.

12. The non-transitory computer-readable storage medium according to claim 11, wherein the instructions further cause the at least one processor to:
  generate the plurality of inverted data blocks, based on a blog content publication or generation time; and
  add a plurality of time stamp skip lists indicating the blog content publication or generation time respectively to the plurality of inverted data blocks, before the search request is received.

13. The non-transitory computer-readable storage medium according to claim 12, wherein the plurality of time stamp skip lists are respectively added to headers of the plurality of inverted data blocks.

14. The non-transitory computer-readable storage medium according to claim 11, wherein each of the first inverted data block, the second inverted data block and the third inverted data block is obtained using header information of a respective one of the first inverted data block, the second inverted data block and the third inverted data block.

* * * * *